T. G. BOGGS.

MEDICINE GLASS.

No. 7,606. Reissued April 17, 1877.

Attest:
Wm. A. McKinley
Wm. J. Burns

Inventor:
T. G. Boggs

UNITED STATES PATENT OFFICE

T. G. BOGGS, OF PHILADELPHIA, PENNSYLVANIA.

IMPROVEMENT IN MEDICINE-GLASSES.

Specification forming part of Letters Patent No. 85,203, dated December 22, 1868; reissue No. 7,606, dated April 17, 1877; application filed March 23, 1869.

*To all whom it may concern:*

Be it known that I, T. G. BOGGS, of Philadelphia, Pennsylvania, have invented an Improvement in Medicine-Glasses; and I do hereby declare the following to be a full, clear, and exact description of the same.

My invention consists of a medicine-glass the cover of which is ground upon its upper surface, for writing upon, and on which are formed words and other markings, as fully described hereafter, the object of my invention being to afford an infallible guide (in carrying out the instructions of a physician) to the person whose duty it is to administer the medicine in the glass.

In order to enable others to make and use my invention, I will describe the mode of constructing and using the same, reference being had to the accompanying drawing, which forms a part of this specification, and in which—

Figure 1:
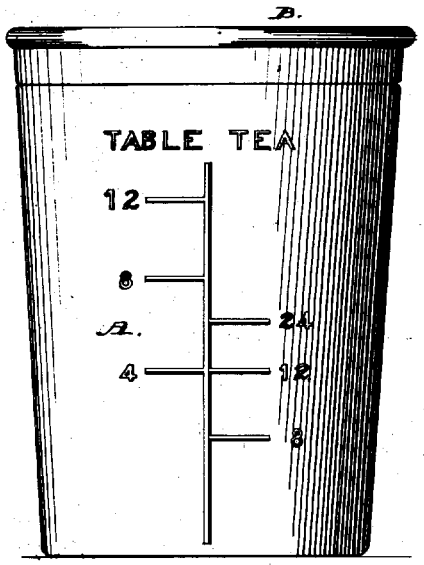
Figure 2:
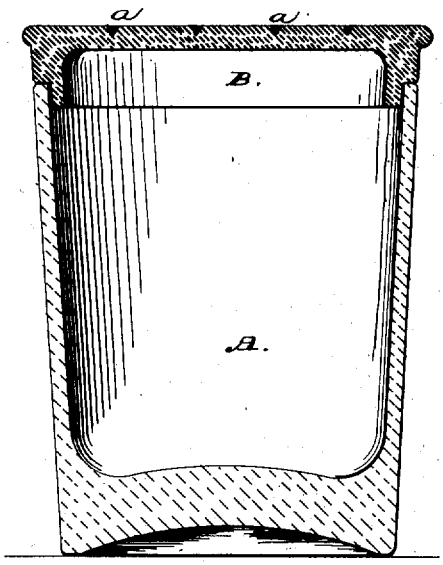
Figure 3:
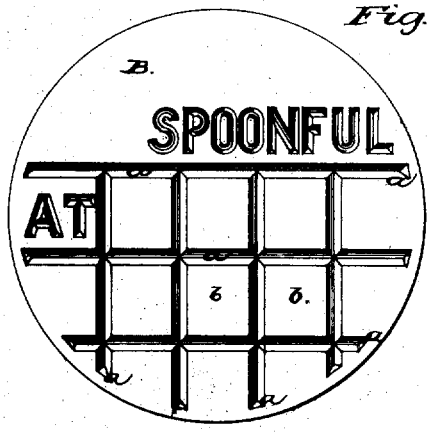

Figure 1 is an external view of my improved medicine-glass; Fig. 2, a sectional view of the same; Fig. 3, a plan view of the cover of the glass; and Fig. 4, another plan view, showing the application of my invention.

Figure 4:
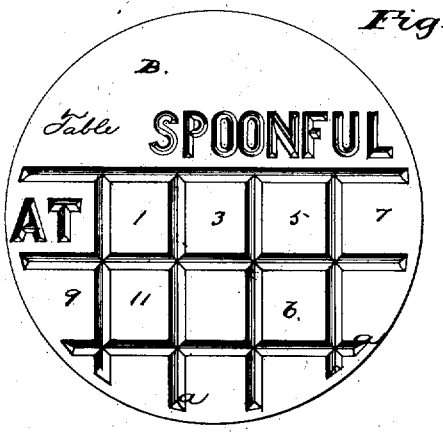

A represents a vessel, of glass, similar in shape, in the present instance, to an ordinary tumbler, and on one side of this vessel are formed graduations for measuring medicine by tea-spoon or table-spoonfuls. (See Fig. 1.) B is a cap or cover, also of glass, which fits accurately on the upper edge of the vessel A, the top of this cover being perfectly flat, and roughened, so that it can be readily marked upon by a pencil, and on this roughened surface are grooves or indentations *a*, molded or cut into the cover, which cross each other at right angles, inclosing squares *b*. About two-thirds of the surface of the cover are thus occupied by the grooves *a* and the inclosed squares, the remaining third being perfectly plain, with the exception of the word "spoonful," molded in the glass in sunken letters. Another word, "at" is formed on the cover, within one of the squares *b*, as seen in Figs. 3 and 4.

The above-described glass is intended as an infallible guide to a nurse in carrying out the directions of a physician in administering medicine.

It is used as follows: The medicine, having been prepared, is placed in the glass, the proper quantity to be administered (whether in tea or table spoonfuls) being determined by the graduations on the side of the glass.

The physician then, instead of trusting to verbal instructions, which are liable to be misunderstood or forgotten, writes upon the roughened surface of the cover the quantity of medicine to be taken at one time, and the hours at which it must be administered.

This is clearly shown in the last figure of the drawing, which is a view of the cover as it appears when the directions are thus written upon it, the direction in the present instance reading as follows: "One table-spoonful at one, three, five, seven," &c., indicating that this quantity (a table-spoonful) is to be taken every two hours, beginning at one o'clock.

It will be seen that the marking and squares upon the cover (which, however, can be varied, if desired) enable the physician to quickly write these directions, and in a manner which will be readily understood by the person whose duty it is to administer the medicine.

By my device the medicine in the glass is kept pure and clean.

It is not essential, in carrying out my invention, that the glass should be graduated, nor that the cover should be marked as herein described; but

I claim as my invention and desire to secure by Letters Patent—

1. A cover for medicine-glasses, consisting of a plate of glass, or similar vitreous substance, roughened, by grinding or other analogous method, upon its top surface, so as to adapt said cover to be written upon, substantially as described.

2. A cover for medicine-glasses, having a ground or roughened surface, as herein described, and upon the same surface words and other markings, arranged substantially as and for the purpose specified.

3. The combination of the above with a graduated medicine-glass, for the purposes described.

T. G. BOGGS.

Witnesses:

WM. ABT. ALEX. MCKINLEY,

W. J. BURNS.